Figure 1:
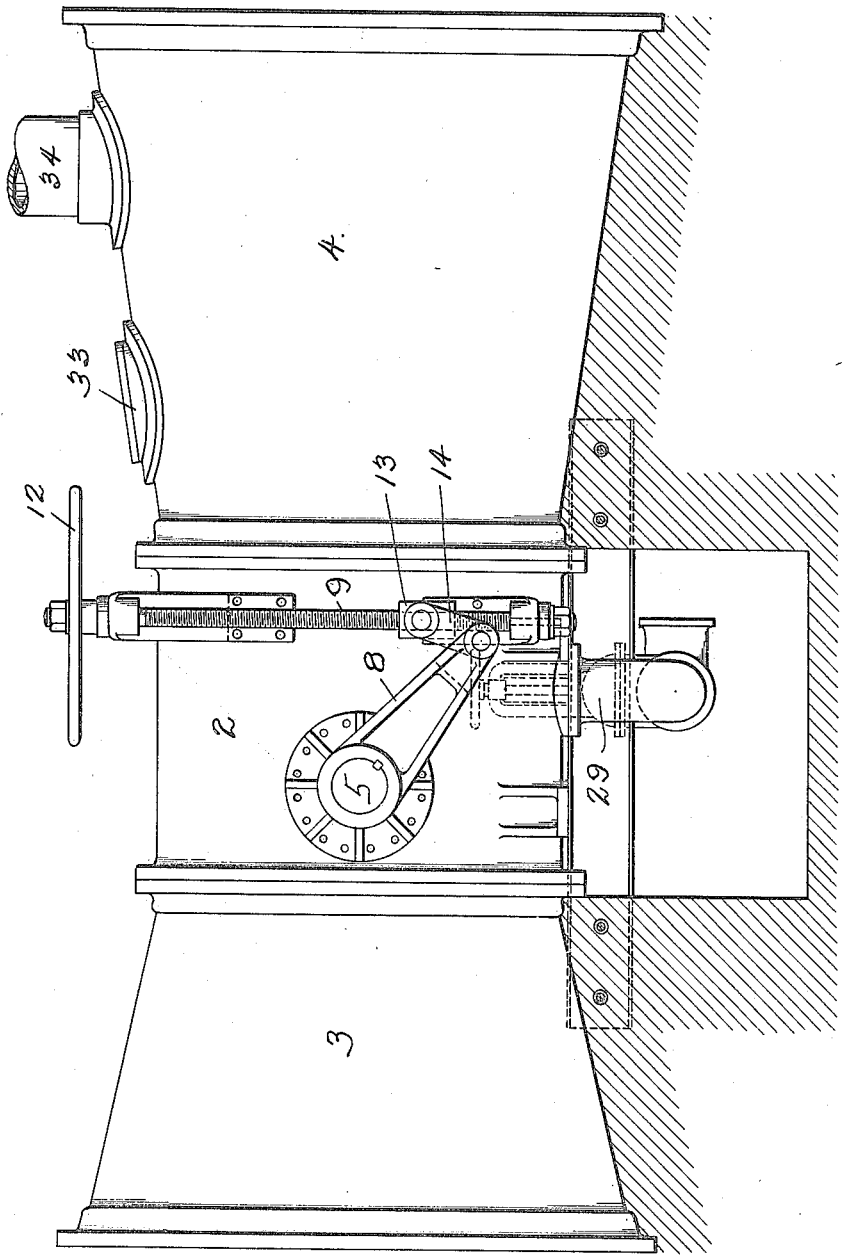

W. A. DOBLE.
BUTTERFLY VALVE.
APPLICATION FILED FEB. 3, 1913.

1,161,460.

Patented Nov. 23, 1915.
4 SHEETS—SHEET 1.

WITNESSES
J. B. Gardner
H. G. Trost

INVENTOR
W. A. DOBLE
BY Miller & White
HIS ATTORNEYS

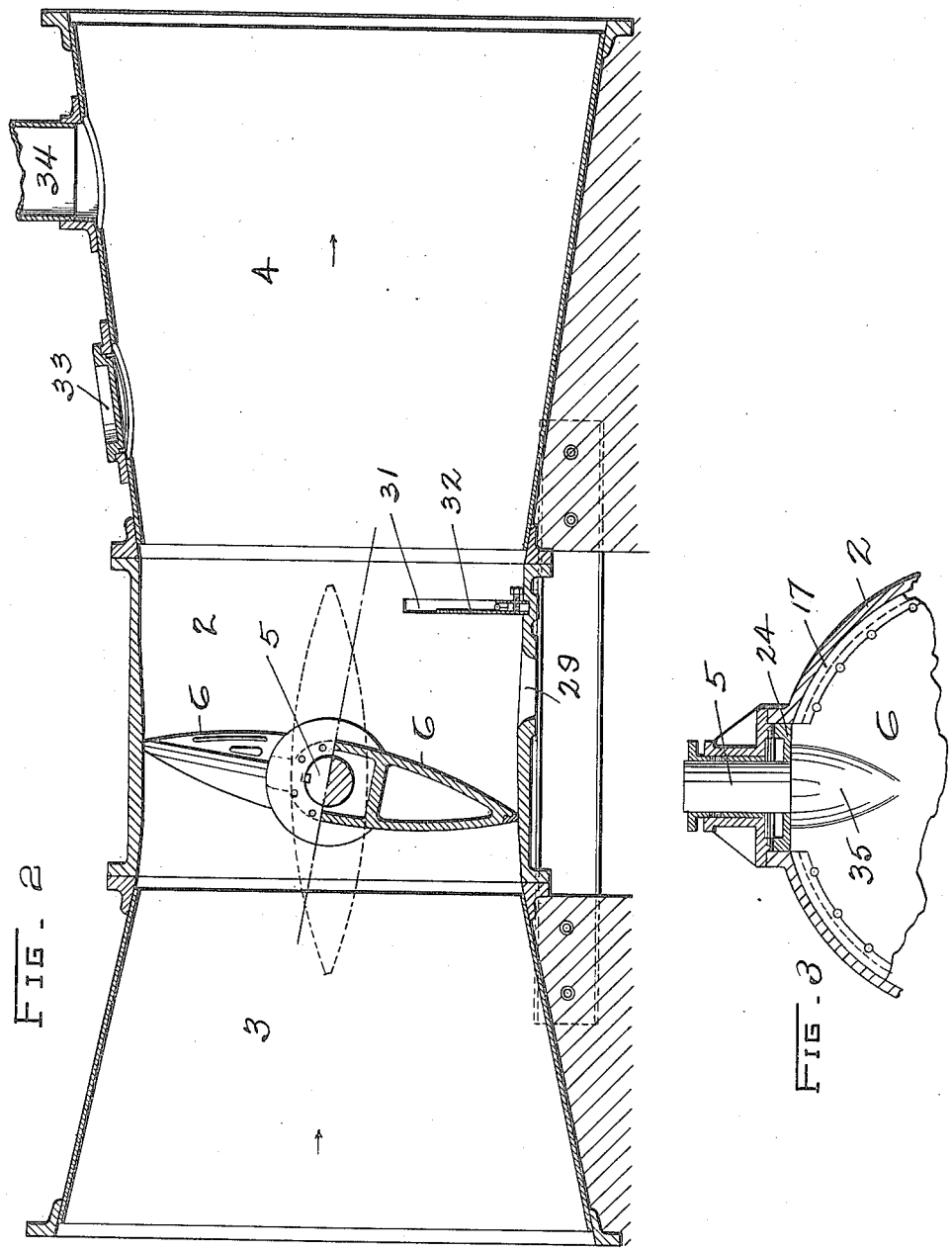

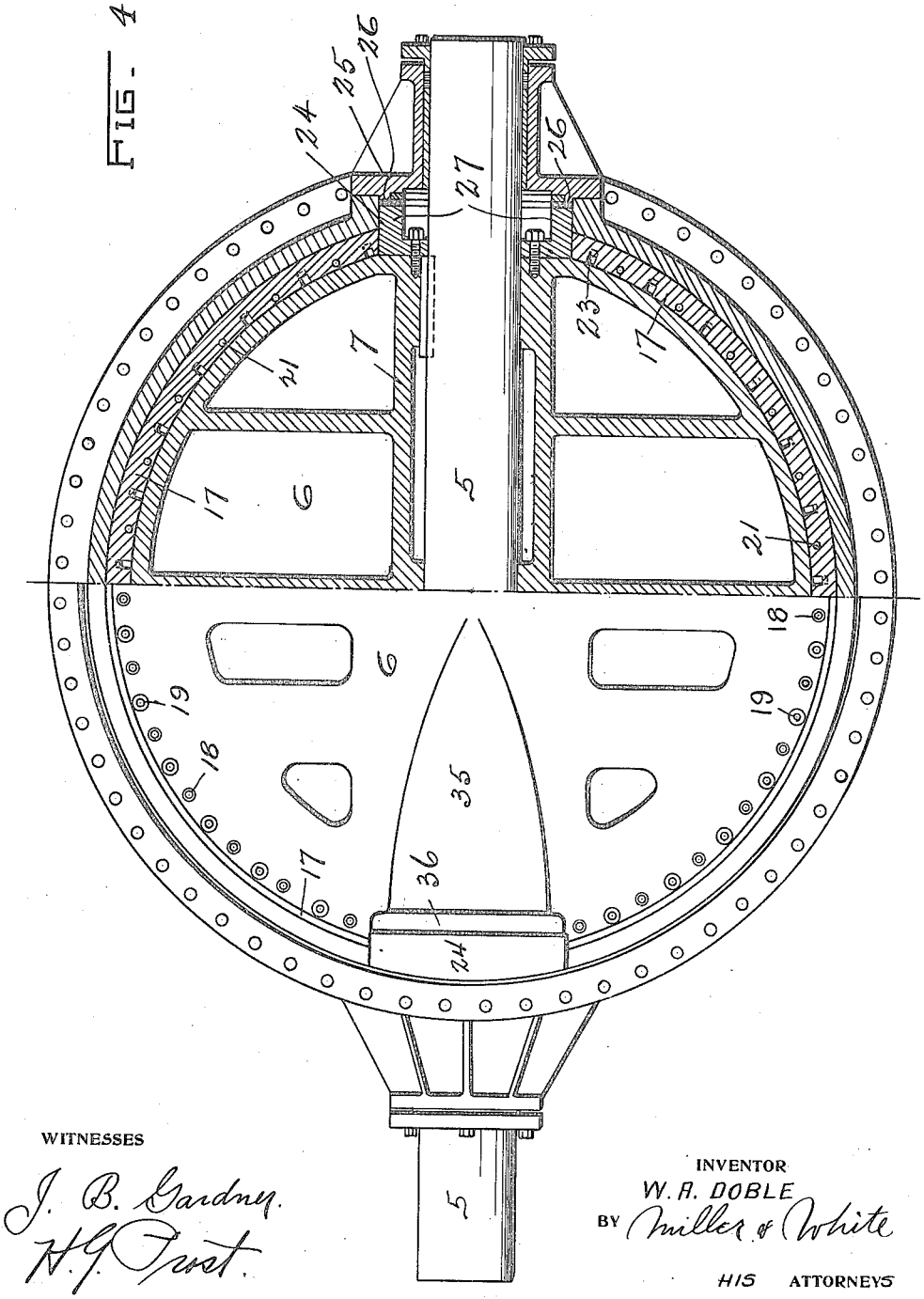

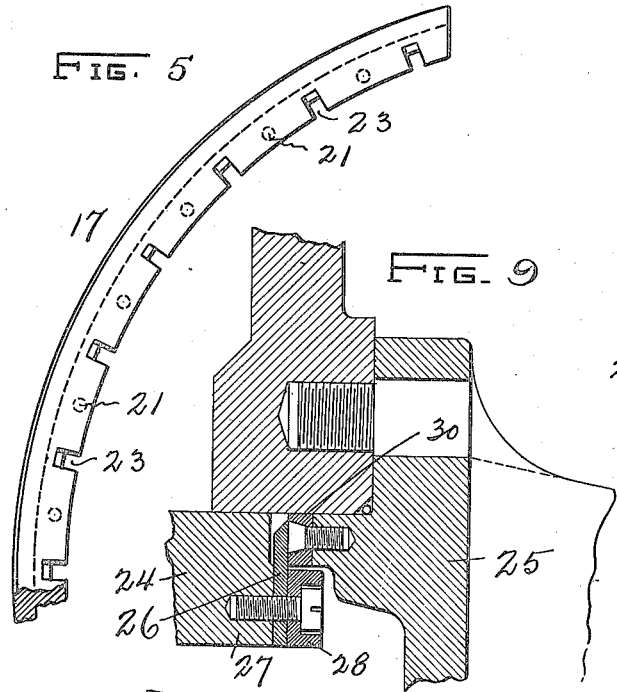
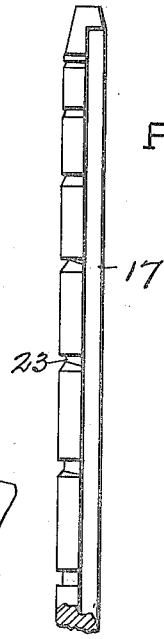
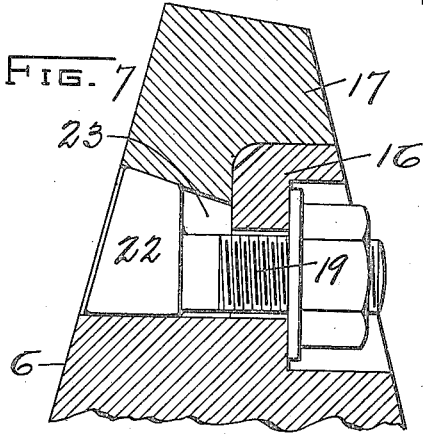
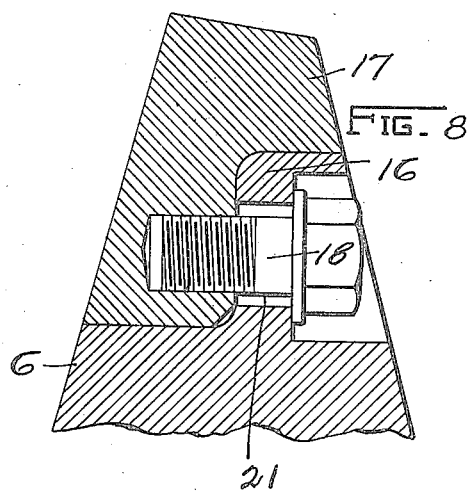

UNITED STATES PATENT OFFICE.

WILLIAM A. DOBLE, OF SAN FRANCISCO, CALIFORNIA, ASSIGNOR TO PELTON WATER WHEEL COMPANY, OF SAN FRANCISCO, CALIFORNIA, A CORPORATION OF CALIFORNIA.

BUTTERFLY-VALVE.

1,161,460. Specification of Letters Patent. Patented Nov. 23, 1915.

Application filed February 3, 1913. Serial No. 745,953.

*To all whom it may concern:*

Be it known that I, WILLIAM A. DOBLE, a citizen of the United States, and a resident of the city and county of San Francisco, State of California, have invented certain new and useful Improvements in Butterfly-Valves, of which the following is a specification.

The invention relates to large butterfly valves which are adapted to control the flow of water in pipes.

The object of the invention is to provide a butterfly valve of such construction that the water passing therethrough is particularly free from disturbances.

Another object of the invention is to provide a butterfly valve construction in which the valve is of less diameter than the pipe, but which allows the water to pass without any material loss.

Another object of the invention is to provide a butterfly valve disk having an adjustable and renewable periphery.

A further object of the invention is to provide an improved mounting for the disk that will prevent leakage past the disk.

The invention possesses other advantageous features, which, with the foregoing, will be set forth at length in the following description, where I shall set forth at length that form of the invention selected for illustration in the drawings forming part of the present specification. The novelty of the invention will be included in the claims succeeding said description. From this it will be apparent that I do not restrict myself to the showing made by said drawings and description as I may adopt many variations within the scope of my invention as set forth in said claims.

Referring to said drawings: Figure 1 is an exterior view of the valve body with its approach and discharge portions. Fig. 2 is a vertical cross section through the valve, the valve disk being shown partly in section. Fig. 3 is a fragmental cross section of the valve taken through the axis of the trunnions. Fig. 4 is an end view of the valve body showing the disk in the closed position, one-half thereof being shown in section. Fig. 5 is a side view of part of the adjustable periphery of the disk. Fig. 6 is an end view of the periphery shown in Fig. 5. Fig. 7 is a detail cross section of the periphery of the disk taken through one of the adjusting bolts. Fig. 8 is a detail cross section of the periphery of the disk taken through one of the clamping bolts. Fig. 9 is a detail cross section of the joint between the valve body and the valve disk at the shaft.

It is desirable for many reasons that a valve controlling the flow of water in a pipe be made as small as possible, provided of course, that it does not interfere materially with the flow of the water when the valve is opened. When the valve is made smaller than the pipe its cost is less and the energy required to operate it is also obviously less than if it were of the same diameter as the pipe. By taking advantage of the Venturi law it is possible to carry a quantity of water through a converging cone and then a diverging cone without material loss, and by placing the valve between the cones, a valve of smaller diameter than the pipe may be employed. In the present construction, the diameter of the pipe is eight feet six inches, whereas the diameter of the valve body is six feet, the valve being used as a stop valve to control the water supply to a pipe line. The valve may also be advantageously employed in tunnels or other conduits and its use is not to be understood as limited to pipe lines.

On the intake side of the valve body 2 is arranged the converging cone 3 and on the discharge side is arranged the diverging cone 4, the cones being of such proportion that the Venturi law is applicable to the flow of water therethrough. Arranged within the valve body 2, and suitably journaled on opposite sides thereof is the shaft 5, carrying the valve disk 6. The valve disk is made convex in shape so that when the valve is open, the disk acts as a rudder or guide for the water, reducing eddy currents and other disturbances and improving the carrying capacity of the valve. The stream lines of the water are not broken and at the same time a disk of sufficient rigidity and strength is obtained. The disk 6 is provided with a hub 7 through which the shaft 5 extends and to which the shaft is secured by suitable keys. The disk is made hollow and is provided interiorly with suitable webs or ribs so that the desired strength is obtained.

The disk is operated from the exterior of the valve body by means of the lever 8 secured to the shaft 5. The lever may be moved by any form of energy, such as hydraulic, electric or manual, the construction shown in the drawings being arranged to be operated by hand. In this construction there is provided a screw spindle 9 provided with a hand wheel 12 at the end and engaging a cross head nut 13, which is attached to the lever 8 by the link 14. The disk is made of such shape and dimensions that when it is in the closed position it lies at an angle of approximately 80 degrees to the axis of the valve body. This feature is advantageous in that it lessens the arc through which the disk must be moved from full open to the closed position, thereby simplifying the valve operating mechanism, lessening the time and energy required for opening and closing the valve, and allowing a tight joint to be made between the disk and the valve body.

The disk is provided with an adjustable and renewable periphery which is adapted to be manipulated so that a practically non-leaking valve is obtained. The disk is provided with an annular shoulder 16 on its rear side, of less width than the disk at its periphery. Against this shoulder is set a ring 17 preferably formed of bronze, which is held in place by the bolts 18—19. The side walls of the ring 17 conform to the convexity of the outer surface of the disk, so that it forms a peripheral extension of the disk. The ring is divided into two parts, each of less length than a semi-circle, lying on opposite sides of the shaft 5, which is provided with other means which will be hereinafter set forth, for preventing leakage at that point.

The ring is held in position by means of the bolts or screws 18 passing through holes 21 in the shoulder 16 and engaging the ring. The holes 21 are made of larger diameter than the bolts 18 so that the bolts may move radially of the disk when the ring is adjusted. The adjustment of the ring is accomplished by means of the bolts 19 which are provided with tapered heads 22 engaging in tapered or inclined slots 23 in the ring. It is evident that as the bolts 19 are tightened the ring is forced out radially of the disk. By closing the valve and then manipulating the bolts 18—19, the ring is set out tightly against the valve body and a tight joint is obtained.

An important feature of the present construction is the means employed for preventing leakage past the shaft or trunnion of the valve disk. Heretofore, as far as I am aware, butterfly valves have been constructed with the shaft or trunnion joined directly to the edge of the disk. It is obvious that to permit of rotation of the disk in such construction, that at the point where it joins the shaft the disk must be cut away to permit rotation thereof. This feature is objectionable since it necessarily permits excessive leakage at that point. To obviate this feature I have attached to the valve disk at opposite sides the piston heads 24 which encircle the shaft 5 and which rotate in seats in the valve body. The disk is provided with tapered thickened portions 35 on both sides which terminate in circular portions 36 against which the piston heads are pressed to form a tight joint therewith. These circular portions lie within the circumference of the disk body, and the piston heads lie partly within the circumference of the ring segments 17 and partly beyond the same, the rings 17 terminating at the pistons. The pistons are preferably formed with flanged or upset peripheries, or, in other words, are cupped, and between the ends of the standing sides and the bearing block 25 are arranged packing rings which prevent any leakage through the joint. The packing ring 26 is clamped to the end of the standing sides 27 of the piston by the ring 28 which is secured to the piston by screws which are countersunk into the ring 28. The outer portion of the end face of the sides 27 is sunk below the inner part so that the packing ring 26 is spaced apart therefrom at the outer portion. This allows the water which has leaked through the running joint to force the packing against the brass ring 30 on the bearing block. The joint between the packing and the brass ring is, therefore, sealed by the pressure of the water.

The valve body is provided behind the disk with a valve 29, through which the water may pass when it is desired to drain the body, for the purposes of repair or adjustment. Behind the outlet for this valve the body is provided at its lower portion with a groove 31 in which the portable dam 32 may be clamped to prevent any leakage water from passing into the pipe line when it is desired to dry and paint or repair the same. The diverging cone 4 is provided with a man-hole 33 to allow access to the interior of the valve when desirable. The diverging cone is also provided with a standpipe 34 which extends above the pressure head that comes on the valve, so that when the valve is closed, the water in the pipe may drain out, drawing in air through the stand-pipe to prevent the collapse of the pressure pipe.

I claim:

1. A butterfly valve comprising a valve body, a butterfly disk arranged therein, a converging conical intake to said body, and a diverging conical discharge therefrom.

2. In a butterfly valve, a cylindrical body, a convex butterfly disk mounted for rotation in said body, a converging conical approach to said body, and a diverging conical discharge therefrom.

3. In a butterfly valve, a disk provided at its periphery with radially adjustable metallic ring segments.

4. In a butterfly valve, a disk, metallic ring segments mounted on the periphery of said disk and means for adjusting said ring segments radially.

5. In a butterfly valve, a disk, metallic ring segments mounted on said disk and extending beyond the periphery thereof, and means for adjusting the position of said ring segments.

6. In a butterfly valve, a valve body, a disk mounted in said body adapted to close the passage therethrough, said body being provided in the rear of said disk with a groove adapted to be engaged by a portable dam, and a valve controlled discharge outlet arranged in said body between the disk and the dam.

7. In a butterfly valve, a disk, ring segments mounted on said disk and extending beyond the periphery thereof, said segments being provided with tapering slots, and taper bolts engaging in said slots and passing through said disk.

8. In a butterfly valve, a valve body, a disk arranged therein, a shaft upon which said disk is mounted, piston heads surrounding said shaft at opposite sides of the disk, and tightly clamped to said disk, said piston heads bearing in seats in said body, and packing rings arranged between the piston heads and the body.

9. In a butterfly valve, a valve body, a disk arranged therein, a shaft upon which said disk is mounted, piston heads secured to said disk surrounding said shaft at opposite sides of the disk, said piston heads bearing in circular seats in said body, and packing rings secured to said piston heads and engaging said body.

10. In a butterfly valve, a disk, metallic ring segments mounted on the periphery of said disk, means for adjusting said segments radially and means for clamping said segments in the adjusted position.

In testimony whereof, I have hereunto set my hand at San Francisco, California, this 29th day of January 1913.

WILLIAM A. DOBLE.

In presence of—
FREDERICK GFELLER,
LEOPOLD M. KAMASCH.